R. COATES.
AGRICULTURAL IMPLEMENT.
APPLICATION FILED OCT. 6, 1910.
992,543.
Patented May 16, 1911.
2 SHEETS—SHEET 2.
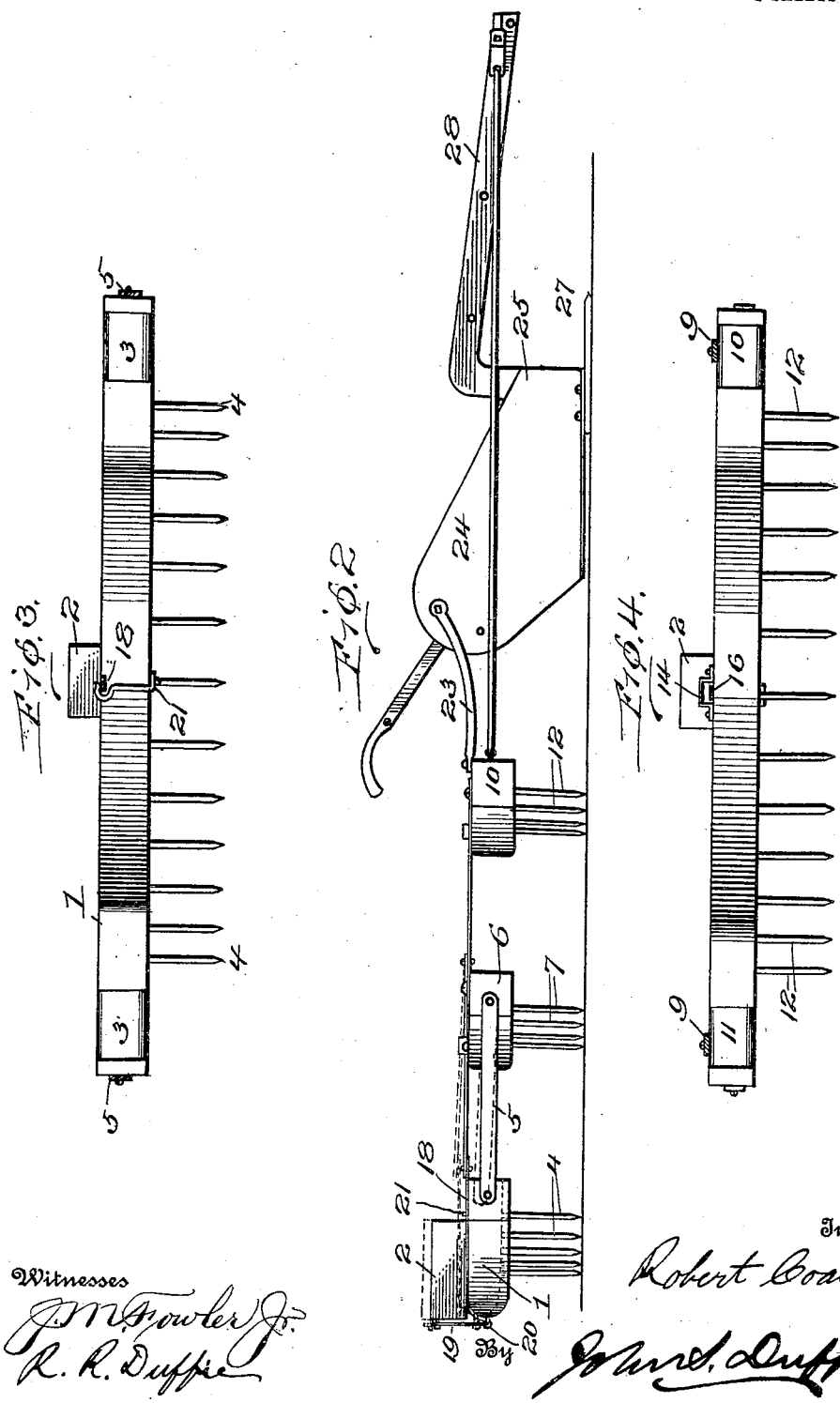

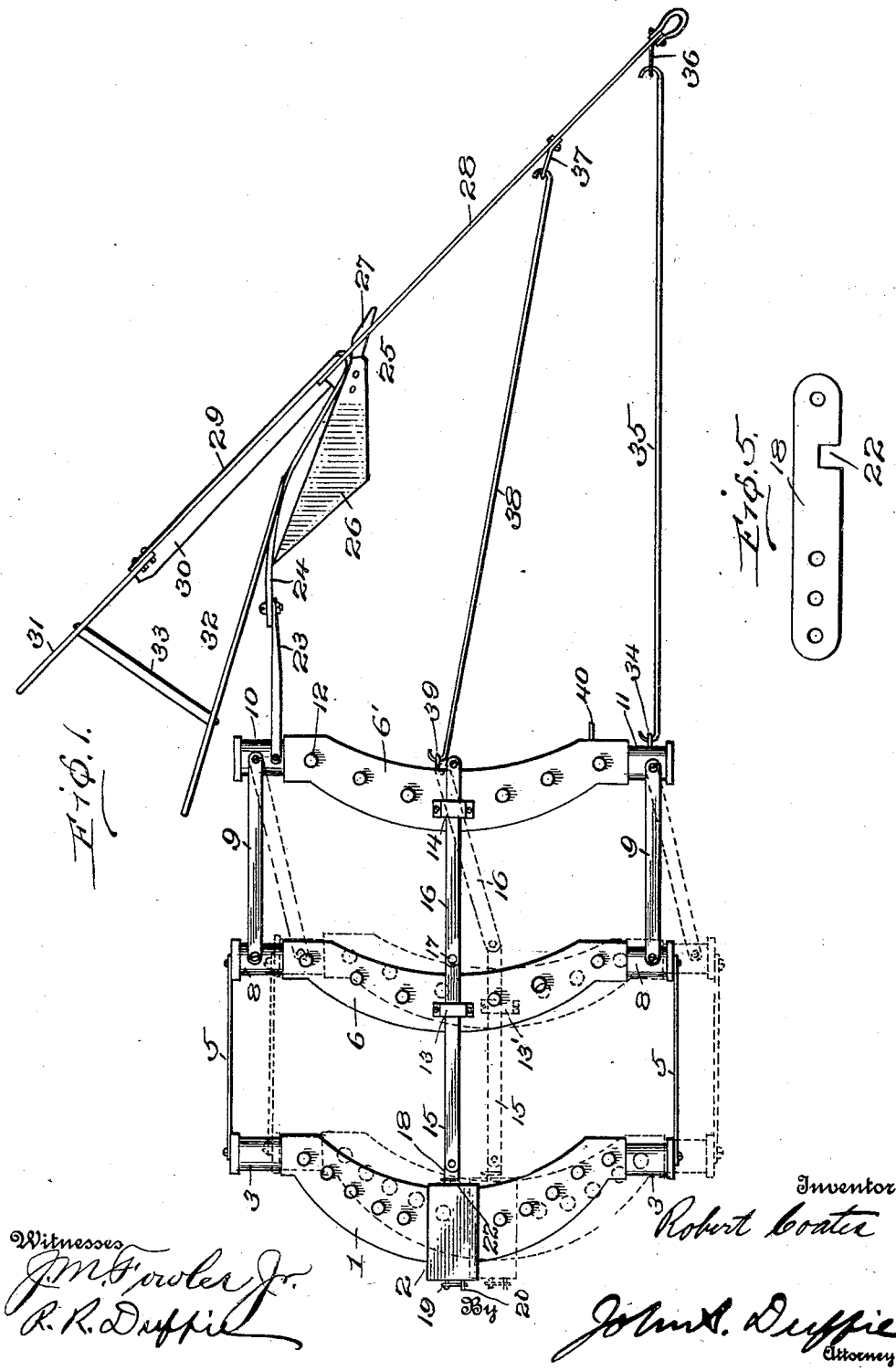

UNITED STATES PATENT OFFICE.

ROBERT COATES, OF WASHINGTON, DISTRICT OF COLUMBIA.

AGRICULTURAL IMPLEMENT.

992,543.  Specification of Letters Patent.  Patented May 16, 1911.

Application filed October 6, 1910. Serial No. 585,644.

*To all whom it may concern:*

Be it known that I, ROBERT COATES, a citizen of the United States, residing at Washington, District of Columbia, have invented certain new and useful Improvements in Agricultural Implements, of which the following is a specification.

My invention is an agricultural implement and consists in the arrangement and combination of its several parts illustrated in the accompanying drawings and described in the specification and the claims hereunto attached.

Reference being made to the drawings: Figure 1 is a top plan view of my invention. Fig. 2 is a side elevation of the same. Fig. 3 is a rear view of the rear end of the invention and of the weight resting thereon. Fig. 4 is a front view of the front cross bar and the front end hinge coupling bar and a front end view of the weight. Fig. 5 is a detail face view of a short coupling plate.

My invention is described as follows:

The numeral 1, represents the rear cross beam, 2, represents the weight which is removably and adjustably secured on the top of said cross beam. Said cross beam has extending from each end a bearing 3, and running perpendicular through said cross beam are harrow teeth 4, all the same length. Secured by hinged coupling bars 5, in front of said cross beam 1, similar to said cross beam 1, and parallel thereto is another cross beam 6, having harrow teeth 7, said last mentioned cross beam 6, being provided at each end with bearings 8; secured to said cross beam 6, by pivoted coupling bars 9, is another cross beam 6', similar to the two cross beams just described and having at one end a bearing 10, and at the other a bearing 11, and also near its right hand an eye 40, and also provided with harrow teeth 12. Secured at the center and to the upper faces of the said cross beams 6, and 6', are loops 13, and 14; running loosely through these loops are two coupling plates 15, and 16, which are hinged together at their inner ends by a coupling bolt 17. To the rear end of the coupling plate 15, is pivoted a short bar 18, to the upper face of which is secured the weight 2. The said weight 2, is provided at its rear end with a hook 19, which hooks into an eye 20, secured in the rear edge of said rear cross beam 1, immediately under said short beam. Hinged to the center and the front face of said rear cross beam 1, is another hook 21, which hooks in a recess 22, in said short beam 18. By means of said two hooks 19, and 21, said weight 2 is securely held in place. Thus secured all three cross beams are held one immediately ahead of the other and parallel with each other.

Pivoted to the upper face of the front cross beam and to the bearing 10, thereof is a brace 23, which extends somewhat upwardly and is pivoted to the upper and rear end of the wing 24, of a turning plow 25. The lower edge of said turning plow turns inwardly forming a cutting blade 26; to the forward end of said cutting blade is secured a cutting point 27. Extending from the front of the said wing 24, of said turning plow 25, is a draft beam 28, the rear end of which turns downwardly. The wing 24, is narrowed and turns backwardly forming a guiding wing 29, leaving between the two wings a V-shaped opening, and running horizontally and inwardly from the lower edge of said guide wing is a cutter 30. Secured to the rear end of said guide wing 30, is a handle 31, and secured to the face of said turning wing is another handle 32, the two handles being braced by a cross brace 33. Secured, by means of a hook and eye 34, to the bearing 11 of the cross beam 6', is a draft rod 35, which by means of a hook and eye 36, is secured to the front end of the plow beam 28. A little to the left and rear of the front end of the said draft rod 35, is an eye 37, and in said eye is secured the hook end of another draft rod 38, the rear end of which is hooked in an eye 39, secured in the front face of the said front cross beam 6'.

By unhooking the hooks 19, and 21, the weight 2, may be entirely removed and the coupling plates 15, and 16, may be withdrawn from the loops 13, and 14, and the rear cross beam may be turned up and rested on the front cross beam, so that trash or any other matter that may be collected in front of the teeth 4, may be removed. In putting the coupling plates 15, and 16, back in place on top of the cross beam I may pass the plate 15, to the right of the loop 13, under an auxiliary loop, represented by dotted lines 13', and thus throw the two rear cross beams to the right, a couple of inches or more, and thus prevent the teeth from all running in the same grooves. I may remove the rear end of the draft rod 35, and hook it through the eye 40, and thus to some extent change of draft on said device.

Although I have specifically described the combination, construction and arrangement of the several parts of my invention, yet I may reserve and exercise the right to make such changes therein as do not depart from the spirit of the invention or the scope of the appended claims.

Having described my invention what I claim as new and desire to secure by Letters Patent is:

1. An agricultural implement consisting of a turning plow; three cross beams arranged, one in advance of the other and having bearings at its ends, and parallel to each other; teeth extending downwardly through said beams; loops secured at the center and on top of the forward two of said cross beams; coupling plates hinged together at their inner ends and passing over the forward cross beams and under said loops; a short coupling plate hinged to the rear end of said rear coupling plate; a weight secured on the top and rear end of said short coupling plate; hooks secured to said cross beam and adapted to hold the weight and short coupling plate down on said rear cross beam; a brace pivoted to the left-hand bearing of said front cross beam, extending forward and secured to the wing of said turning plow, a draft rod adjustably secured to the right hand bearing of said forward cross beam and the draft beam of said plow and hinge plates hinging said cross beams together, substantially as shown and described.

2. In an agricultural implement of the kind described, a turning plow; a cross beam 6′ terminating at one end in the bearing 10 and at the other end in a bearing 11, a brace 23 its rear end pivoted to said bearing 10, its front end to the wing of said turning plow; a draft rod 35 having its rear end hooked to the bearing 11 of said front cross beam, its forward end hooked to the beam of said turning plow near its front end; an auxiliary draft rod 38, its rear end hooked to said front cross beam near its center and its front end to said plow beam, auxiliary cross beams 6 and 1 secured in rear of said front cross beam by hinge rods 5 and 9, harrow teeth extending downwardly through said cross beams, said rear cross beam 1 adapted to be raised when desired.

3. In a device of the character described, three cross beams situated one behind the other some little distance apart, said cross beams provided with harrow teeth; the front and center cross beams being hinged together by coupling rods 9, the center and rear cross beams hinged together by coupling rods 5; loops 13 and 14 secured on top of said center and front cross beams respectively, coupling plates 15 and 16, pivoted together at their centers and passing under said loops, said cross beam 6 being provided with an auxiliary loop 13′, said plate 15 adapted to be passed under said auxiliary loop; short plate 18 pivoted to the rear end of said coupling plate 15, a weight 2 secured on said short plate 18, substantially as shown and described.

In testimony whereof I affix my signature in presence of two witnesses.

ROBERT COATES.

Witnesses:
 NETTIE E. GARNER,
 F. A. MILLIGAN.

---

Copies of this patent may be obtained for five cents each, by addressing the "Commissioner of Patents, Washington, D. C."